(12) United States Patent
Kanagasabai et al.

(10) Patent No.: US 9,563,961 B1
(45) Date of Patent: Feb. 7, 2017

(54) METHOD AND SYSTEM FOR IMAGE PROCESSING

(71) Applicant: XEROX CORPORATION, Norwalk, CT (US)

(72) Inventors: Rajasekar Kanagasabai, Chennai (IN); Sainarayanan Gopalakrishnan, Chennai (IN); Xing Li, Webster, NY (US); Clara Cuciurean-Zapan, Fairport, NY (US); Sudhagar Subbaian, Coimbatore (IN)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 15/000,069

(22) Filed: Jan. 19, 2016

(51) Int. Cl.
*G06K 9/34* (2006.01)
*G06T 7/00* (2006.01)

(52) U.S. Cl.
CPC ... *G06T 7/0081* (2013.01); *G06T 2207/10004* (2013.01)

(58) Field of Classification Search
CPC ...... G06K 9/00456; G06K 9/34; G06K 9/342; H04N 1/403
See application file for complete search history.

(56) References Cited

U.S. PATENT DOCUMENTS

| | | | |
|---|---|---|---|
| 5,513,277 A | 4/1996 | Huttenlocher | |
| 5,920,655 A | 7/1999 | Makita et al. | |
| 7,856,142 B2 | 12/2010 | Ferman et al. | |
| 8,577,144 B2 | 11/2013 | Sullender | |
| 2008/0273807 A1* | 11/2008 | Dauw | G06K 9/00456 382/237 |
| 2011/0001994 A1* | 1/2011 | Matsuda | G03G 15/011 358/1.9 |
| 2012/0039534 A1* | 2/2012 | Malik | H03M 7/3064 382/173 |

* cited by examiner

*Primary Examiner* — Phuoc Tran

(57) ABSTRACT

A method and an application server are provided for processing an image. The application server comprising an image processing unit processes an image by segmenting into first segmented layer and a second segmented layer. The image processing unit identifies one or more regions in the first segmented layer and for a coordinate in the identified region a vicinity check condition is performed in the second segmented layer. The image processing unit compares a first size of identified region with at least an average size of the set of text components in the second segmented layer. Further, the image processing unit merges the identified region with the second segmented layer to get a processed image.

17 Claims, 7 Drawing Sheets

METHOD AND SYSTEM FOR IMAGE PROCESSING

TECHNICAL FIELD

The presently disclosed embodiments are related, in general, to image processing. More particularly, the presently disclosed embodiments are related to a method and a system for correcting of images after segmentation.

BACKGROUND

With advancements in image processing, a plurality of image compression techniques, such as a Mixed Raster Content (MRC) compression technique, has been utilized to reduce a size of an image. During compression, the image may be segmented into a first segmented layer comprising a plurality of image components and a second segmented layer comprising a plurality of text components. Thereafter, the first segmented layer and the second segmented layer may be compressed such that compression ratio of the first segmented layer is less in comparison to the compression ratio of the second segmented layer.

In certain scenarios, during segmentation, a text component of the plurality of text components may be incorrectly segmented in the second segmented layer that comprises the plurality of image components. During compression of the second segmented layer, the text component of the plurality of text components also is compressed, thereby degrading the quality of the text component of the plurality of text components. Hence, the readability of the image may get affected.

Further limitations and disadvantages of conventional and traditional approaches will become apparent to one skill in the art, through comparison of described systems with some aspects of the present disclosure, as set forth in the remainder of the present application and with reference to the drawings.

SUMMARY

According to embodiments illustrated herein there may be provided a method to process an image. The method may utilize one or more processors to process the image. The one or more processors may segment the image into a first segmented layer and a second segmented layer. The one or more processors may further identify a region in the first segmented layer of the image based on at least a first value of plurality of first pixels in the first segmented layer. The one or more processors may be configured to determine, for each coordinate in the identified region, if one or more second pixels, in a vicinity of a third pixel at the coordinate in the second segmented layer of the image, are representative of a set of text components based on at least a second value of each of the one or more second pixels. The one or more processors may be configured to compare a first size of the identified region with at least an average size of the set of text components in the second segmented layer based on the determination. The one or more processors may be further configured to merge the identified region with the second segmented layer based on the comparison.

According to embodiments illustrated herein there may be provided an application server to process an image. The application server includes one or more processors to process the image. The one or more processors may be configured to segment the image into a first segmented layer and a second segmented layer. The one or more processors may be configured to identify a region in the first segmented layer of the image based on at least a first value of plurality of first pixels in the first segmented layer. The one or more processors may be configured to determine, for each coordinate in the identified region, if one or more second pixels, in a vicinity of a third pixel at the coordinate in the second segmented layer of the image, are representative of set of text components based on at least a second value of each of the one or more second pixels. The one or more processors may be configured to compare a first size of the identified region with at least an average size of the set of text components in the second segmented layer based on the determination. The one or more processors may be further configured to merge the identified region with the second segmented layer based on the comparison.

According to embodiments illustrated herein there may be provided a computer program product for use with a computer, the computer program product comprising a non-transitory computer readable medium. In an embodiment, the non-transitory computer readable medium stores a computer program code to process an image. The computer program code is executable by one or more processors to segment the image into a first segmented layer and a second segmented layer. The computer program code is executable by one or more processors to identify a region based on a first value of plurality of first pixels in the first segmented layer. The computer program code is further executable by one or more processors to determine, for each coordinate in the identified region, if one or more second pixels, in a vicinity of a third pixel at the coordinate in the second segmented layer of the image, are representative of set of text components based on at least a second value of each of the one or more second pixels. The computer program code is further executable by one or more processors to compare a first size of the identified region with at least an average size of the set of text components in the second segmented layer based on the determination. The computer program code is further executable by one or more processors to merge, the identified region with the second segmented layer based on the comparison.

BRIEF DESCRIPTION OF DRAWINGS

The accompanying drawings illustrate the various embodiments of systems, methods, and other aspects of the disclosure. Any person with ordinary skills in the art will appreciate that the illustrated element boundaries (e.g., boxes, groups of boxes, or other shapes) in the figures represent one example of the boundaries. In some examples, one element may be designed as multiple elements, or multiple elements may be designed as one element. In some examples, an element shown as an internal component of one element may be implemented as an external component in another, and vice versa. Further, the elements may not be drawn to scale.

Various embodiments will hereinafter be described in accordance with the appended drawings, which are provided to illustrate and not to limit the scope in any manner, wherein similar designations denote similar elements, and in which.

DETAILED DESCRIPTION

Figure 1:
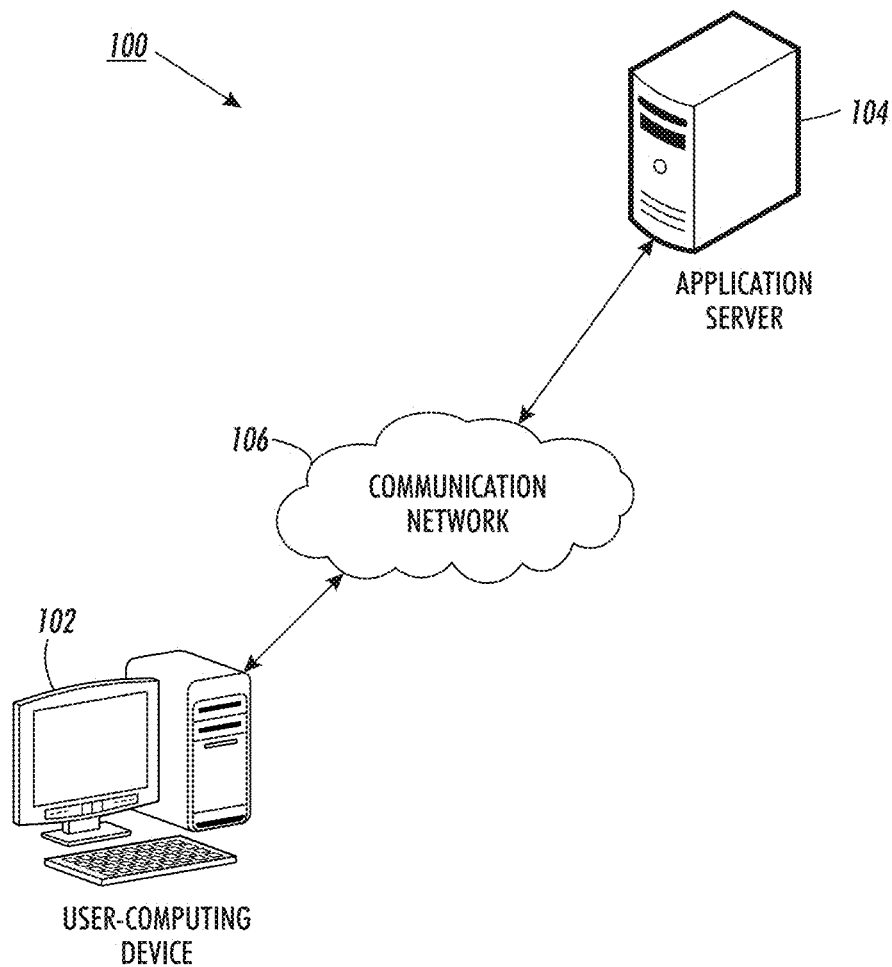
FIG. 1 is a block diagram that illustrates a system environment in which various embodiments of the method and the system may be implemented.

The present disclosure may be best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. For example, the teachings presented and the needs of a particular application may yield multiple alternative and suitable approaches to implement the functionality of any detail described herein. Therefore, any approach may extend beyond the particular implementation choices in the following embodiments described and shown.

References to "one embodiment," "at least one embodiment," "an embodiment," "one example," "an example," "for example," and so on indicate that the embodiment(s) or example(s) may include a particular feature, structure, characteristic, property, element, or limitation but that not every embodiment or example necessarily includes that particular feature, structure, characteristic, property, element, or limitation. Further, repeated use of the phrase "in an embodiment" does not necessarily refer to the same embodiment.

Definitions: The following terms shall have, for the purposes of this application, the respective meanings set forth below.

An "image" refers to an electronic form of a document that contains content stored in a digital form. For example, a scanned document is referred to as an image. The scanned document contains a plurality of text components and a plurality of image components, which are referred to in combination as the content, stored in the digital form. In an embodiment, the image may be received in the MRC format. The image in the MRC format may include the plurality of text components and the plurality of image components. In an embodiment, the plurality of image components and the plurality of text components are pre-segmented into one or more layers. For example, the content comprises a plurality of text components, such as an alphabet, a symbol, and a plurality of images.

A "pixel" refers to a smallest element in an image, stored in a digital form that can be individually addressed. The image comprises a plurality of pixels. The pixel in the image is addressed by specifying a coordinate of the pixel in the image using one or more coordinate systems known in the art. Examples of such coordinate systems comprise a Cartesian coordinate system, and a Polar coordinate system. For example, if an image comprises 12 pixels distributed in a grid comprising three rows and four columns, then a coordinate of a pixel denoted by "p" located in a third row and a second column is given by p(2,3).

"A first segmented layer" corresponds to a layer of an image that may comprise a plurality of image components of the image. In an embodiment, the first segmented layer is extracted from the image based on one or more segmentation techniques.

"A second segmented layer" corresponds to a layer of an image that may comprise a plurality of text components of the image. In an embodiment, the second segmented layer is extracted from the image based on one or more segmentation techniques.

"Plurality of first pixels" refers to pixels in a first segmented layer of an image. In an embodiment, the plurality of first pixels may be representative of a plurality of image components. In an embodiment, each of the individual pixels from the plurality of first pixels may be referred to as a fourth pixel.

"Plurality of second pixels" refers to pixels in a second segmented layer of an image. In an embodiment, the plurality of second pixels may be representative of a plurality of text components. In an embodiment, each of the individual pixel from the plurality of second pixels may be referred to as a third pixel. In an embodiment, the predetermined area in vicinity of the third pixel in the second segmented layer may be referred to as one or more second pixels. In an embodiment, the coordinates of the third pixels may be same as that of each of a fourth pixel in the first segmented layer.

A "region" refers to a portion in a first segmented layer of an image that comprises one or more fourth pixels. In an embodiment, the region may be identified based on a connected component analysis of the first segmented layer. In an embodiment, each pixel in the one or more fourth pixels is assigned a first label that signify that the one or more fourth pixels are connected or constitute the region.

A "value" of a pixel refers to a value that is representative or indicative of an intensity value or a chroma of pixel.

A "binarization" refers to a process by which a plurality of pixels in an image are assigned a binary value (i.e., "1" or "0"). Therefore, each pixel from the plurality of pixels is stored as a single bit i.e., 0 or 1. The pixels are assigned 0 or 1 value based on a threshold value. For example, if the value of a pixel is above the threshold value, the pixel is assigned the binary value 1, else the pixel is assigned the binary value 0.

A "first size" refers to a count of one or more fourth pixels in an identified region from one or more regions in a first segmented layer of an image. For example, if a first segmented layer of an image has two identified regions. A first identified region is represented by 14 fourth pixels and a second identified region is represented by 12 fourth pixels then a first size for the first region is 14 pixels and the first size for the second region is 12 pixels.

An "average size" refers to a ratio of a count of a set of second pixels, representing a set of text components, in a second segmented layer, and a count of text components in the set of text components in the second segmented layer. For example, if a second segmented layer of an image has three text components and three text components are represented by 18 pixels in total. Then average size of set of text components in the second segmented layer is six pixels.

"Second size" refers to a count of a set of second pixels representing a text component, which is represented by a maximum number of pixels among the text components in the set of text components. For example, consider three text components, in a second segmented layer. A first text component is represented by 16 pixels, a second text component is represented by 9 pixels and a third text component is represented by 11 pixels, then a second size is 16 as the third text component of the set of text components is represented by a maximum number of pixels among the three text components in the second segmented layer.

FIG. 1 is a block diagram that illustrates a system environment 100 in which various embodiments of the method and the system may be implemented. In an embodiment, the system environment 100 corresponds to a system for image processing. The system environment 100 includes a user-computing device 102, an application server 104, and a communication network 106. The user-computing device 102 and the application server 104 are communicatively coupled to each other via the communication network 106. In an embodiment, the application server 104 communicates with the user-computing device 102 using one or more protocols such as, but not limited to, Open Database Connectivity (ODBC) protocol and Java Database Connectivity (JDBC) protocol.

In an embodiment, the user-computing device 102 refers to a computing device that may be configured to receive instructions from a user, such as but not limited to, scan, print, display, upload, and download an image. The user-computing device 102 may comprise one or more processors and one or more memories. The one or more memories may include a computer readable code that may be executable by the one or more processors to perform predetermined operations. The user-computing device 102 may be further configured to transmit an image to the application server 104, via the communication network 106. In an embodiment, the user-computing device 102 may transmit the image to the application server 104 for compression purposes. The user-computing device 102 may be further configured to receive a processed image from the application server 104. In an embodiment, the user-computing device 102 may display the processed image on a display screen of the user-computing device 102. Examples of the user-computing device 102 may include, but are not limited to, a personal computer, a laptop, a personal digital assistant (PDA), a mobile device, a tablet, or any other computing device.

In an embodiment, the application server 104 refers to a computing device or a software framework hosting an application or a software service. In an embodiment, the application server 104 may be implemented to execute procedures such as, but not limited to, programs, routines, or scripts stored in one or more memories for supporting the hosted application or the software service. In an embodiment, the hosted application or the software service may be configured to perform one or more predetermined operations. The application server 104 may be realized through various types of application servers such as, but not limited to, a Java application server, a .NET framework application server, a Base4 application server, a PHP framework application server, or any other application server framework. The operation of the application server 104 has been described later in conjunction with FIG. 2.

In an embodiment, the application server 104 may be configured to receive the image from the user-computing device 102. In an embodiment, the application server 104 may perform a compression operation on the image. In an embodiment, for compression purposes, the application server 104 may be configured to segment the received image to generate a first segmented layer and a second segmented layer by using one or more segmentation techniques. Examples of the one or more segmentation techniques may include, but not limited to, a Meanshift segmentation technique, an Efficient graph based segmentation technique, and a Hybrid segmentation technique. In an embodiment, the application server 104 may be configured to perform binarization of the first segmented layer using one or more binarization techniques to generate a binarized first segmented layer. Examples of the one or more binarization techniques may include, but are not limited to, a Sauvola binarization technique, a Niblack binarization technique, and a Bernsen binarization technique. In an embodiment, the application server 104 may be further configured to implement a connected component analysis technique to identify one or more regions within the binarized first segmented layer. The application server 104 may be further configured to determine a first size associated with each of the one or more regions. In addition, the application server 104 may determine a second size of the set of text components in a second segmented layer of the image. The application server 104 may also determine an average size of the set of text components in the second segmented layer of the image.

The application server 104 may be further configured to extract the one or more regions from the first segmented layer based on the first size, the second size, and the average size. The application server 104 may be further configured to merge the extracted one or more regions with the second segmented layer. The application server 104 may be further configured to merge a modified first segmented layer, after extraction of the one or more regions, with a modified second segmented layer, after merging of the one or more regions. The application server 104 may be further configured to transmit a processed image, obtained after merging the modified first segmented layer and the modified second segmented layer, to the user-computing device 102.

A person having ordinary skill in the art will appreciate that the scope of the disclosure is not limited to realizing the application server 104 and the user-computing device 102 as separate entities. In an embodiment, the application server 104 may be realized as an application program installed on and/or running on the user-computing device 102 without departing from the scope of the disclosure.

In an embodiment, the communication network 106 corresponds to a communication medium through which the user-computing device 102, and the application server 104, may communicate with each other. Such a communication may be performed, in accordance with various wired and wireless communication protocols. Examples of such wired and wireless communication protocols include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, 2G, 3G, 4G cellular communication protocols, and/or Bluetooth (BT) communication protocols. The communication network 106 includes, but is not limited to, the Internet, a cloud network, a Wireless Fidelity (Wi-Fi) network, a Wireless Local Area Network (WLAN), a Local Area Network (LAN), a telephone line (POTS), and/or a Metropolitan Area Network (MAN).

Figure 2:
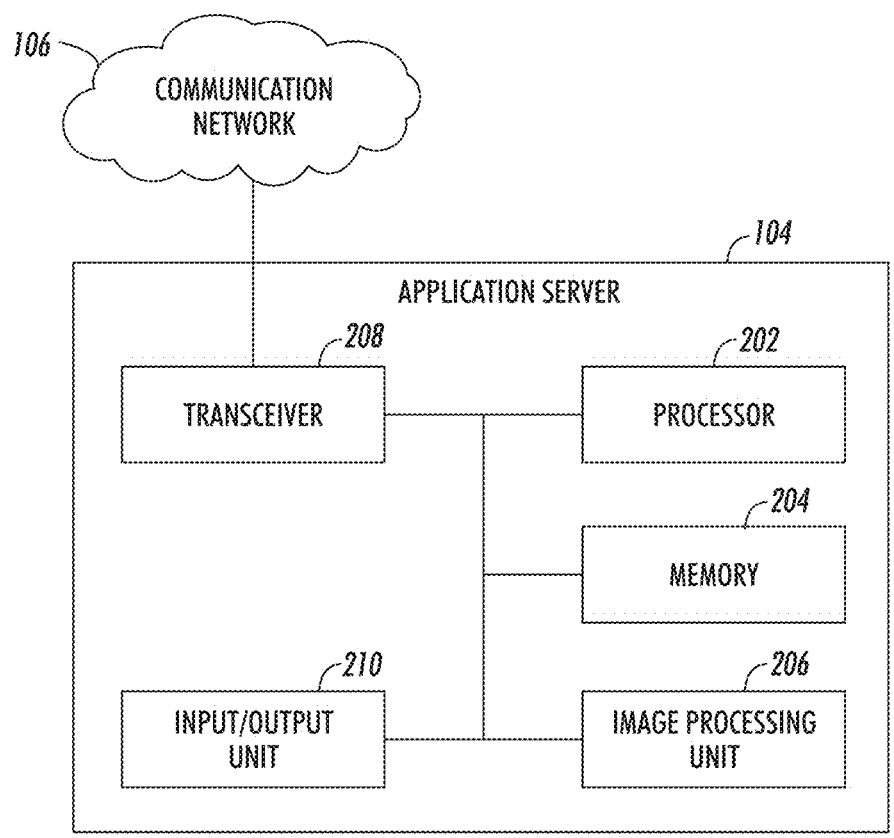
FIG. 2 is a block diagram that illustrates an application server configured to process an image, in accordance with at least one embodiment.

FIG. 2 is a block diagram that illustrates the application server 104 configured to process the image, in accordance with at least one embodiment. FIG. 2 is explained in conjunction with elements from FIG. 1. In an embodiment, the application server 104 includes a processor 202, a memory 204, an image processing unit 206, a transceiver 208, and an input/output unit 210. The processor 202 may be connected to the memory 204, the transceiver 208, the image processing unit 206 and the input/output unit 210. The transceiver 208 may be communicatively coupled to the communication network 106.

The processor 202 comprises suitable logic, circuitry, interfaces, and/or code that may be configured to execute a set of instructions stored in the memory 204. The processor 202 may work in conjunction with the memory 204, the image processing unit 206, the transceiver 208, and the input/output unit 210 to perform one or more functions based on the set of instructions. The processor 202 works in conjunction with the image processing unit 206 to process the image. The processor 202 may be implemented based on a number of processor technologies known in the art. Examples of the processor 202 include, but are not limited to, an X86-based processor, a Reduced Instruction Set Computing (RISC) processor, an Application Specific Integrated Circuit (ASIC) processor, a Complex Instruction Set Computing (CISC) processor, and/or other processor.

The memory 204 comprises suitable logic, circuitry, interfaces, and/or code that may be configured to store the set of instructions, which are executed by the processor 202. In an embodiment, the memory 204 may be configured to store one or more programs, routines, or scripts that are executed by the processor 202 in conjunction with the image processing unit 206. In an embodiment, one or more instructions may be stored in memory 204. In an embodiment, one or more instructions may correspond to segmentation, binarization, and connected component analysis. The memory 204 may be implemented based on a Random Access Memory (RAM), a Read-Only Memory (ROM), a Hard Disk Drive (HDD), a storage server, and/or a Secure Digital (SD) card.

The image processing unit 206 comprises suitable logic, circuitry, and/or interfaces that may be configured to execute one or more instructions stored in the memory 204 to perform one or more image processing operations. The image processing unit 206 may be implemented using one or more processor technologies known in the art. Examples of the image processing unit 206 may include, but are not limited to, an X86 based processor, a RISC processor, a CISC processor, or any other processor. In an embodiment, the image processing unit 206 may be implemented as an Application-Specific Integrated Circuit (ASIC) microchip designed for a special application, such as to extract one or more regions from the first segmented layer and merge the extracted one or more regions with the second segmented layer. Further, the image processing unit 206 may be configured to merge the modified first segmented layer and the modified second segmented layer to obtain the processed image.

The transceiver 208 comprises suitable logic, circuitry, interfaces, and/or code that may be configured to receive the image from the user-computing device 102, via the communication network 106. In an embodiment, the received image may be a pdf document that is available in an MRC format. Further, the transceiver 208 may transmit the processed image to the user-computing device 102, via the communication network 106. The transceiver 208 implements one or more known technologies to support wired or wireless communication with the communication network 106. In an embodiment, the transceiver 208 includes, but is not limited to, an antenna, a radio frequency (RF) transceiver, one or more amplifiers, a tuner, one or more oscillators, a digital signal processor, a Universal Serial Bus (USB) device, a coder-decoder (CODEC) chipset, a subscriber identity module (SIM) card, and/or a local buffer. The transceiver 208 communicates via wireless communication with networks, such as the Internet, an Intranet and/or a wireless network, such as a cellular telephone network, a wireless local area network (LAN) and/or a metropolitan area network (MAN). The wireless communication uses any of a plurality of communication standards, protocols and technologies, such as: Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS).

The input/output unit 210 comprises suitable logic, circuitry, interfaces, and/or code that may be configured to receive an input from a user of the user-computing device 102. In an embodiment, the input/output unit 210 may be configured to transmit an output to a user of the user-computing device 102. In an embodiment, the user may correspond to a requestor who may have requested to process the image. The input/output unit 210 comprises various input and output devices that are configured to communicate with the processor 202. Examples of the input devices include, but are not limited to, a keyboard, a mouse, a joystick, a touch screen, a microphone, a camera, and/or a docking station. Examples of the output devices include, but are not limited to, a display screen and/or a speaker.

In operation, the processor 202 may receive an image, to process, from the user-computing device 102 via the transceiver 208. In an embodiment, the processor 202 may have received the request to compress the image from the user computing device 102. In order to compress the image, in an embodiment, the processor 202 may instruct the image processing unit 206 to segment the received image into a plurality of segmented layers based on a segmentation technique stored in the memory 204. Examples of the segmentation techniques may include, but are not limited to, a Meanshift segmentation technique, an Efficient graph based segmentation technique, and a Hybrid segmentation technique. In an embodiment, the image processing unit 206 in conjunction with the processor 202 may segment the received image into the first segmented layer and the second segmented layer. In an embodiment, the segmentation may be performed such that the plurality of image components may be present in the first segmented layer and the plurality of text components may be present in the second segmented layer. In an embodiment, in certain scenarios, the segmentation process is not perfect, which may cause one or more of text components from the plurality of text components being identified as a set of image components. Therefore, the first segmented layer may comprise the one or more text components along with the plurality of image components.

In an alternate embodiment, the processor 202 may receive the image in an MRC format. Further, in an embodiment, the image in the MRC format may include one or more pre-segmented layers. The one or more pre-segmented layers may comprise the first segmented layer and the second segmented layer. As discussed, the first segmented layer and the second segmented layer may comprise one or more of text components and one or more image components.

To detect the one or more text components in the first segmented layer, the image processing unit 206 in conjunction with the processor 202 may binarize the first segmented layer using one or more binarization techniques. Examples of the binarization techniques may include, but are not limited to, a Sauvola binarization technique, a Niblack binarization technique, and a Bernsen binarization technique. While performing binarization, the image processing unit 206 may assign a first value to each of a plurality of first pixels in the first segmented layer. In an embodiment, the first value may correspond to a binary value. In an embodiment, the plurality of first pixels may be assigned "zero" or "one" value based on an original value associated with each of the plurality of first pixels. In an embodiment, the original value of pixel refers to a value that is representative or indicative of an intensity value or a chroma, of the pixel. In an embodiment, "zero" value may be assigned to a first pixel of the plurality of first pixels, when the original value associated with the first pixel is below a predetermined threshold. Similarly, "one" value may be assigned to the first pixel, when the original value is above a predetermined threshold.

After binarization of the first segmented layer, in an embodiment, the image processing unit 206 may identify one or more regions in the binarized first segmented layer. The one or more regions may be identified based on the first value associated with each of the plurality of first pixels in the binarized first segmented layer using connected component analysis technique. For example, consider that first segmented layer comprises 9 pixels comprising of 3 pixel rows and 3 pixel columns and let the pixels in a first pixel column and pixels in a bottom most pixel row have the first value as "one". Thus, the image processing unit 206 applies the connected component analysis technique on the first segmented layer to identify the first pixel column and the bottom most pixel row as a region. In an embodiment, each of the one or more regions may comprise one or more fourth pixels. Further, the image processing unit 206 in conjunction with the processor 202 may determine the coordinates of each of the one or more fourth pixels in each of the one or more regions. In an embodiment, the one or more fourth pixels are a subset of the plurality of first pixels in the first segmented layer. In an embodiment, the coordinates of each of the one or more fourth pixels may be stored in the memory 204.

In an embodiment, the image processing unit 206 may determine a first size associated with each of the one or more regions. The first size may be denoted by "$S_{reg}$". In an embodiment, the first size may correspond to a count of the one or more fourth pixels in each of the one or more regions. For example, the image processing unit 206 has identified two regions in the binarized first segmented layer. The first identified region be represented by 7 fourth pixels, and the second identified region be represented by 12 fourth pixels. Therefore, the first size of the first identified region is 7 and the first size for the second identified region is 12.

A person skilled in the art will understand that the scope of the disclosure should not be limited to determining the first size based on the aforementioned factors and using the aforementioned techniques. Further, the examples provided in supra are for illustrative purposes and should not be construed to limit the scope of the disclosure.

In an embodiment, after determination of the one or more regions in the first segmented layer, the image processing unit 206 may select a fourth pixel from the one or more fourth pixels in a region from the one or more identified regions. Further, the image processing unit 206 may determine a coordinate of the selected fourth pixel.

The image processing unit 206 in conjunction with the processor 202 may be configured to identify a third pixel in the second segmented layer that is at same coordinate as the coordinate of the selected fourth pixel in the binarized first segmented layer. For example, if the coordinate of the selected fourth pixel in the binarized first segmented layer is p(3,4) then the coordinate of the third pixel in the second segmented layer is p(3,4).

After identifying the third pixel in the second segmented layer, the image processing unit 206 in conjunction with the processor 202 may receive a user-defined input, via transceiver 208. In an embodiment, the user-defined input may correspond to a range or a predetermined area around the third pixel that may define the vicinity of the third pixel. In another embodiment, the user-defined input may correspond to a region, around the third pixel, in the second segmented layer, which may have any shape such as, but are not limited to a circular shape, a rectangular shape, or a square shape. In an embodiment, the predetermined area around the third pixel may correspond to the vicinity of the third pixel. In an embodiment, the predetermined area in vicinity of the third pixel comprises one or more second pixels.

In an embodiment, the image processing unit 206 may determine a second value of the one or more second pixels in vicinity of the third pixels. Based on the second value of the one or more second pixels, the image processing unit 206 may identify a set of second pixels that may be representative of the set of text components. In an embodiment, the image processing unit 206 may compare the second value of the one or more second pixels (in the vicinity of the third pixel) with a predetermined threshold value to determine whether a second pixel from the one or more second pixels corresponds to the set of second pixels. In an embodiment, the predetermined threshold value may be deterministic of one or more properties of the plurality of text components in the second segmented layer. For example, a text component in the second segmented layer may have a chroma value of "0" (i.e., black color). Based on such properties of the text component, the image processing unit 206 may determine the predetermined threshold value, and thus accordingly identify the set of text components.

If the image processing unit 206 determines that the one or more second pixels are not representative of the set of text components in the second segmented layer, the image processing unit 206 may select a new fourth pixel from the one or more fourth pixels.

If the image processing unit 206 determines that the one or more second pixels comprise the set of second pixels that is representative of the set of text components, the image processing unit 206 may be configured to determine a second size of the set of text components. In an embodiment, the image processing unit 206 may determine the second size based on the maxima of the count of the set of second pixels representing each text component in set of text components in the vicinity of the third pixel. In an embodiment, the image processing unit 206 may utilize the following equation to determine the second size:

$$T_{max} = \max(P_1, P_2, P_3, \ldots P_N) \quad (1)$$

where $P_1$ refers to a count of the set of second pixels representing a first text component in vicinity of the third pixel;

$P_2$ refers to a count of the set of second pixels representing a second text component in vicinity of the third pixel; and $P_N$ refers to a count of the set of second pixels representing an $N^{th}$ text component in vicinity of the third pixel.

Further, the image processing unit 206 may be configured to determine an average size the set of text components in vicinity of the third pixel. The average size of the set of text components is determined based on the following equation:

$$T_{avg} = \frac{N_s}{C_s} \quad (2)$$

where $N_s$ refers to a count of the set of second pixels representing each of the set of text components; and $C_s$ refers to a count of the set of text components in vicinity of the third pixel in the second segmented layer.

For example, the set of second pixels are representative of three text components, in the second segmented layer. A first text component is represented by 12 pixels, a second text component represented by 10 pixels and a third text component represented by 14 pixels, then the second size of the set of text components in the second segmented layer is 14, as the third text component is represented by the maximum number of the second pixels in the second segmented layer. Further, the average size of the set of text components is 12.

A person skilled in the art will understand that the scope of the disclosure should not be limited to determining the second size and the average size based on the aforementioned factors and using the aforementioned techniques. Further, the examples provided in supra are for illustrative purposes and should not be construed to limit the scope of the disclosure.

After determining the second size and the average size of the set of text components, the image processing unit 206 may be configured to receive a user-defined input, denoted by "k", which is a constant that may be indicative of a number of pixels in the second segmented layer.

The image processing unit 206 in conjunction with the processor 202 may compare the first size of the identified region denoted by $S_{reg}$ with the second size $T_{max}$ and the ($T_{avg}$−k) in accordance with equation 3 to determine the possibility of the identified region being text.

$$T_{max} > S_{reg} > (T_{avg} - k) \quad (3)$$

According to the equation 3, the first size of the identified region $S_{reg}$, should be less than the second size of the set of text components in the second segmented layer and greater than the term ($T_{avg}$−k). The identified region may be recognized as the set of text components only if the identified region satisfies the equation 3.

For example, consider an identified region, in a first segmented layer, with a first size of 9 pixels. The second size ($T_{max}$) of the set of text components in vicinity of the third pixel in the second segmented layer is 12 pixels, an average size $T_{avg}$ of the set of text components in the second segmented layer is 8, and a user-defined input "k" is 3. Therefore, ($T_{avg}$−k)=5. Values considered for $T_{max}$, $T_{avg}$, and K satisfy equation 3. Thus, the identified region is recognized as the set of text components.

The image processing unit 206 may extract the identified region from the first segmented region based on the comparison to get a modified first segmented layer. In an embodiment, the modified first segmented layer does not contain the identified region, if the first size $S_{reg}$ of the identified region satisfies the equation 3. In an embodiment, if the first size $S_{reg}$ of the identified region does not satisfy the equation 3 then image processing unit 206 selects a coordinate of a fourth pixel in the next identified region, from one or more identified region, in the binarized first segmented layer.

The image processing unit 206 may merge the extracted identified region with the second segmented layer to get a modified second segmented layer. In an embodiment, the modified second segmented layer comprises the set of text components.

In an embodiment, after the merging of the set of text components from the first segmented layer to the second segmented layer, the image processing unit 206 may be configured to perform a compression operation on the modified first segmented layer and the modified second segmented layer. Thereafter, the image processing unit 206 may merge the compressed second segmented layer with the compressed first segmented layer to obtain a processed image. After obtaining the processed image, the image processing unit 206 in conjunction with the processor 202 may store the processed image in memory 204. Further, the processed image may be transmitted by transceiver 208 to external environment. In an embodiment, the external environment may correspond to user-computing device 102. Further, the user may use the received processed image for one or more purpose such as, but not limited to, download, print, display, fax, and email.

Figure 3A:
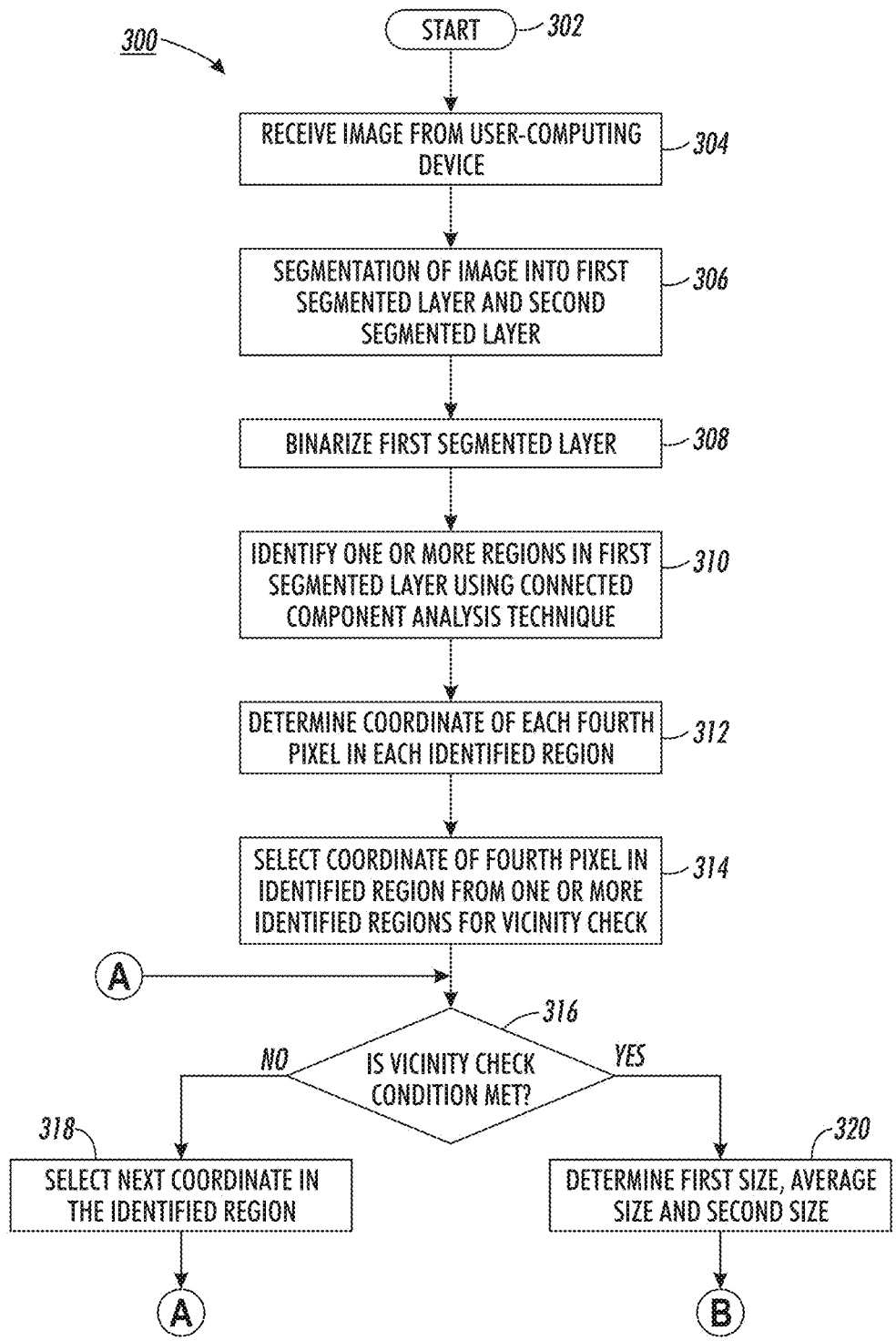
FIG. 3A and FIG. 3B illustrate a flowchart to process an image, in accordance with at least one embodiment.
Figure 3B:
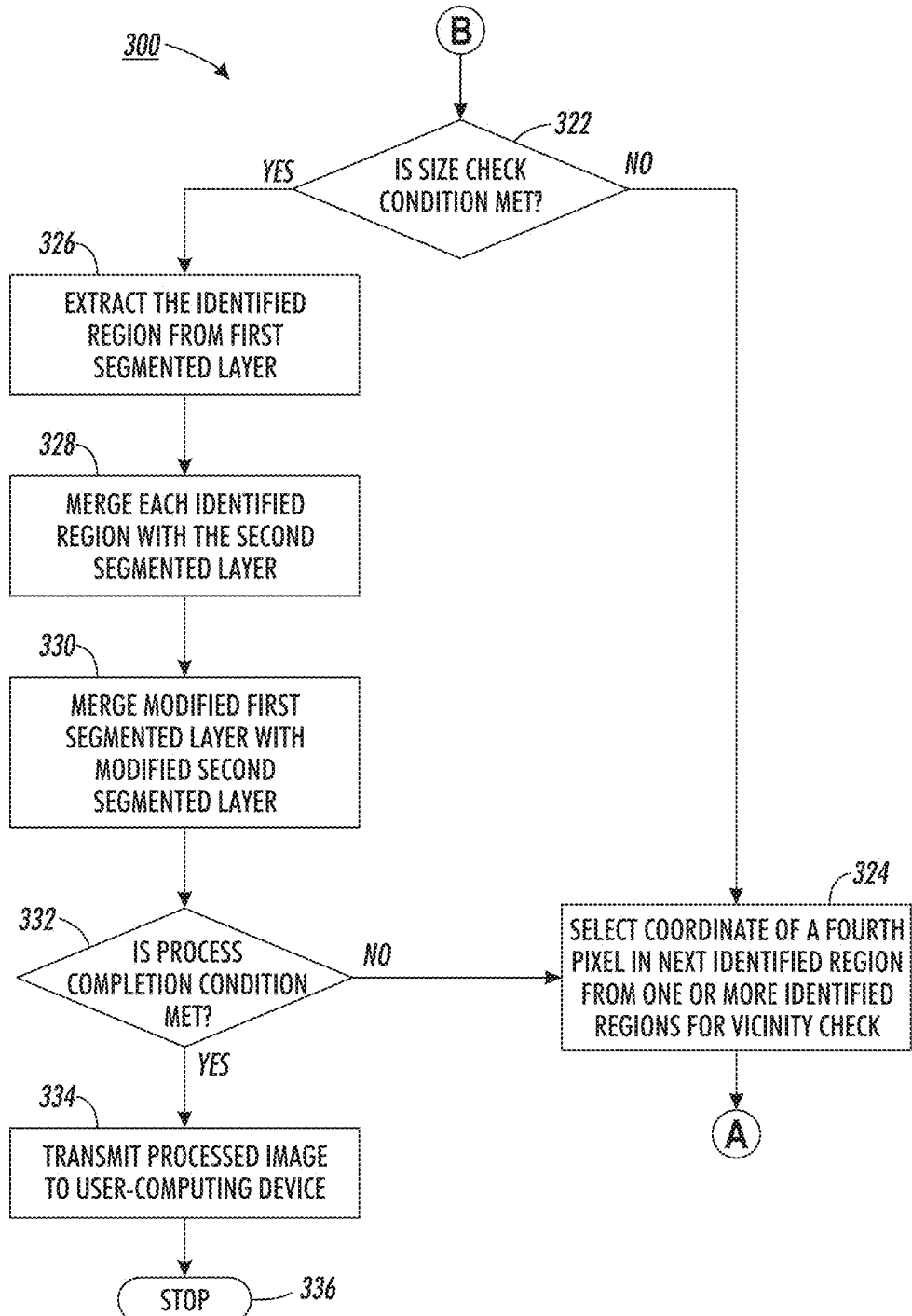

FIG. 3A and FIG. 3B illustrate a flowchart 300 for processing the image, in accordance with at least one embodiment. The flowchart 300 is described in conjunction with FIG. 1 and FIG. 2.

The method starts at step 302 and proceeds to step 304. At step 304, the application server 104 may receive the image. At step 306, the image processing unit 206 may segment the image into the first segmented layer and the second segmented layer. At step 308, the image processing unit 206 may binarize the first segmented layer using one or more binarization techniques stored in the memory 204. In an embodiment, during binarization the processor 202 may assign a binary value such as 0 or 1, to each pixel from the plurality of first pixels of the first segmented layer. At step 310, the image processing unit 206 may identify one or more regions in the first segmented layer using the connected component analysis technique stored in the memory 204. At step 312, the image processing unit 206 may determine the coordinates of one or more fourth pixels in the one or more regions in the first segmented layer. At step 314, the image processing unit 206 may select a fourth pixel in a region from one or more regions. Further, the image processing unit 206 may determine the coordinate of the selected fourth pixel. The image processing unit 206 may identify the third pixel in the second segmented layer at the coordinate same as the coordinate of the fourth pixel in the first segmented layer. At step 316, the image processing unit 206 may identify one or more second pixels in the vicinity of the third pixel. The image processing unit 206 may further determine whether the one or more second pixels comprise the set of second pixels, representing the set of text components, in the vicinity of the third pixel. If the vicinity check condition (i.e., the set of second pixels is not identified in the vicinity of the third pixel) is unsuccessful then the method proceeds to step 318 else the method proceeds to step 320.

At step 318, the image processing unit 206 may select the next fourth pixel in the identified region and repeat the step 316. At step 320, the image processing unit 206 may determine the first size of the identified region. Further, the image processing unit 206 may determine the second size, and the average size of the set of text components in the second segmented layer (identified in vicinity of the third pixel). At step 322, the image processing unit 206 may determine whether a size check condition is met or not (i.e., equation 3). In an embodiment, the size check condition corresponds to a comparison of the first size of the identified region with the average size and the second size of the set of text components in the segmented layer. In an embodiment, if size check condition is met then the identified region is recognized as a text component. If the size check condition is met then the method proceeds to step 326, else method proceeds to step 324.

At step 324, the image processing unit 206 may select the fourth pixel in the next identified region from the one or more identified region and repeat the step 316. At step 326, the image processing unit 206 may extract the identified region from the first segmented layer to obtain a modified first segmented layer. At step 328, the identified region may be merged with the second segmented layer to generate a modified second segmented layer. At step 330, the image processing unit 206 may merge the modified first segmented layer with the modified second segmented layer to obtain the processed image. At step 332, the application server 104 checks for a process completion condition. In an embodiment, the process completion condition refers to a condition in which the application server 104 checks whether all the regions are examined on not. If process completion condition is successful then the method proceeds to step 334 else the method proceeds to 324. At step 334, the application server 104 may transmit the processed image to the user-computing device 102. Control passes to end step 336.

Figure 4A:
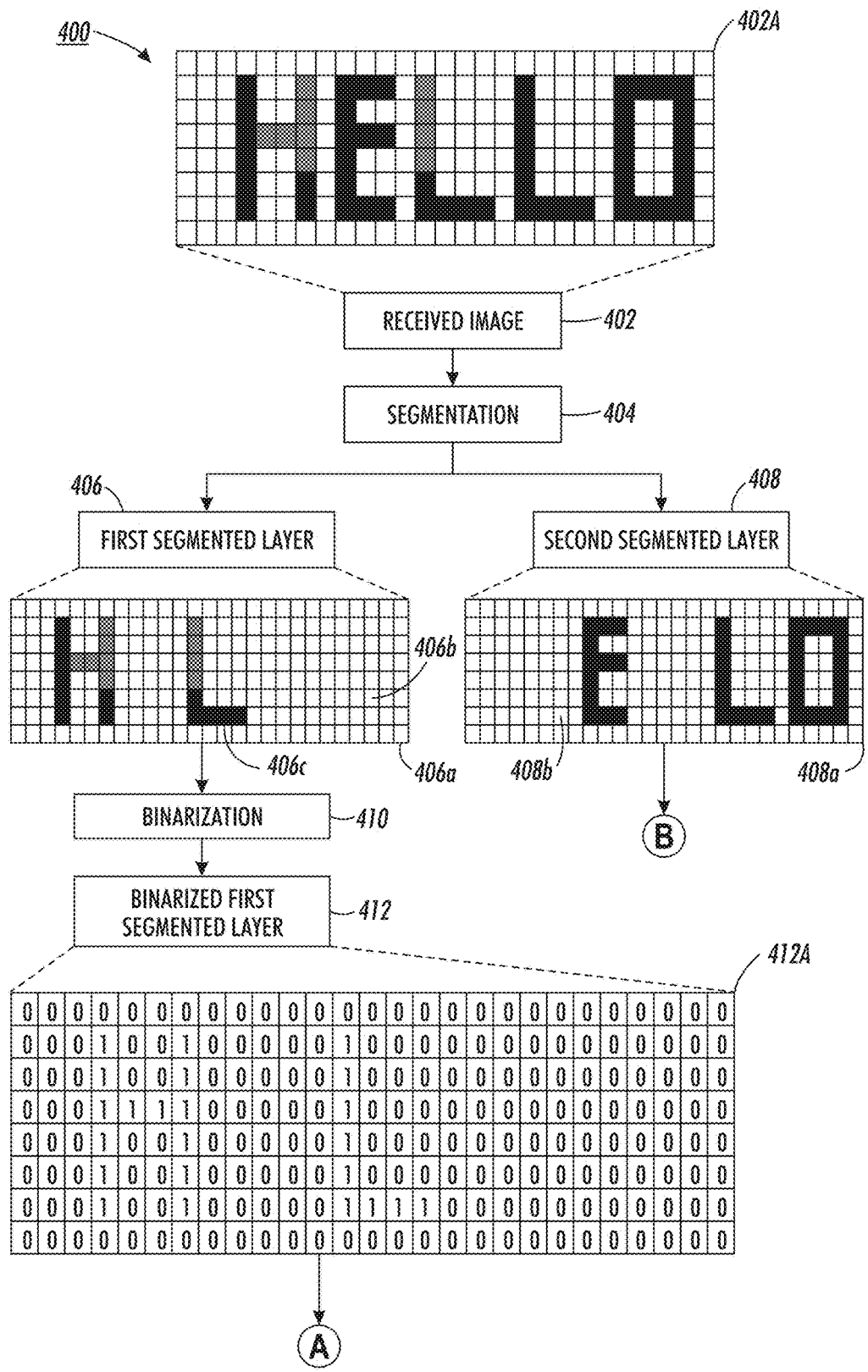
FIGS. 4A, 4B, and 4C illustrate an exemplary scenario to process an image in accordance with at least one embodiment.
Figure 4B:
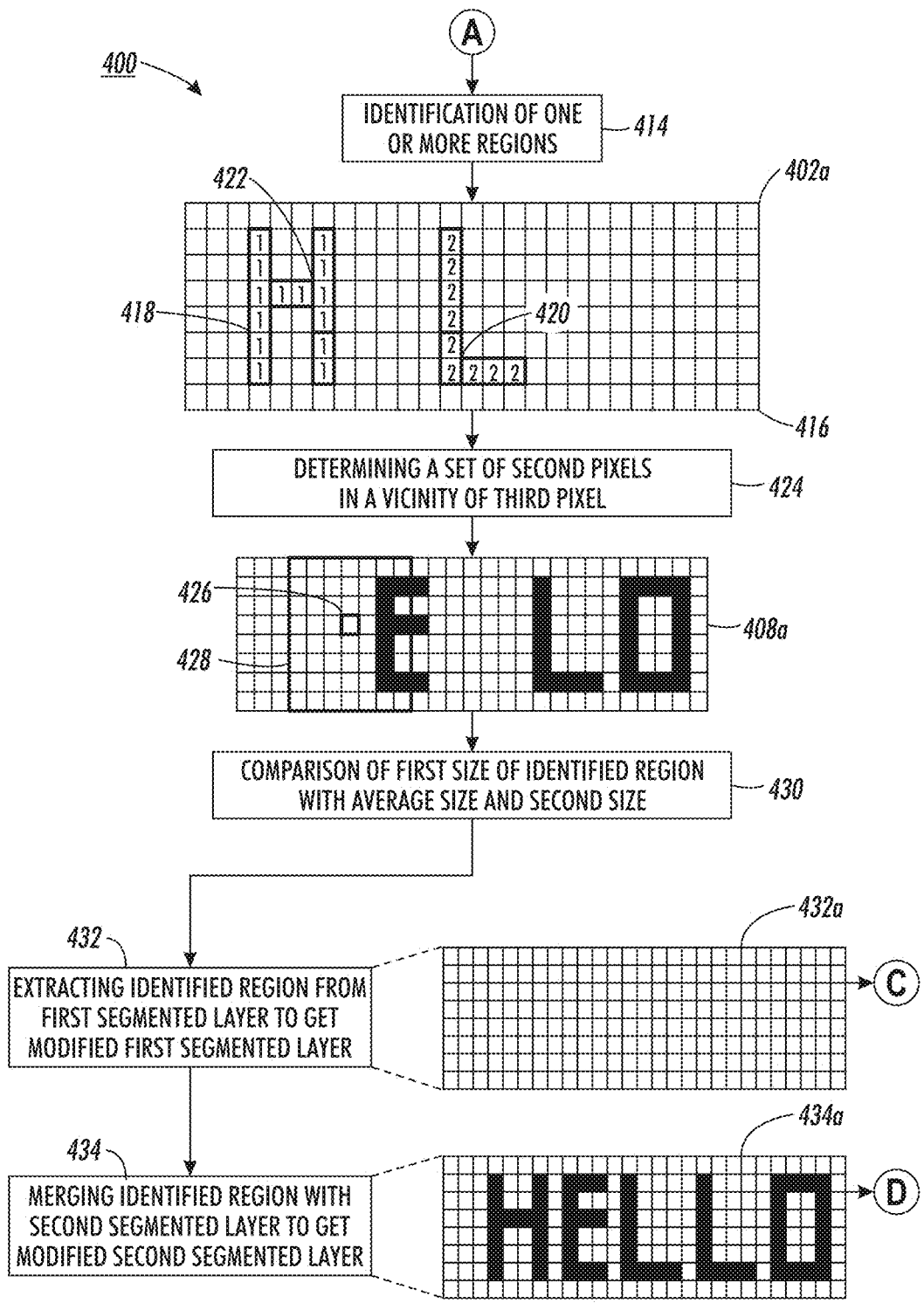
Figure 4C:
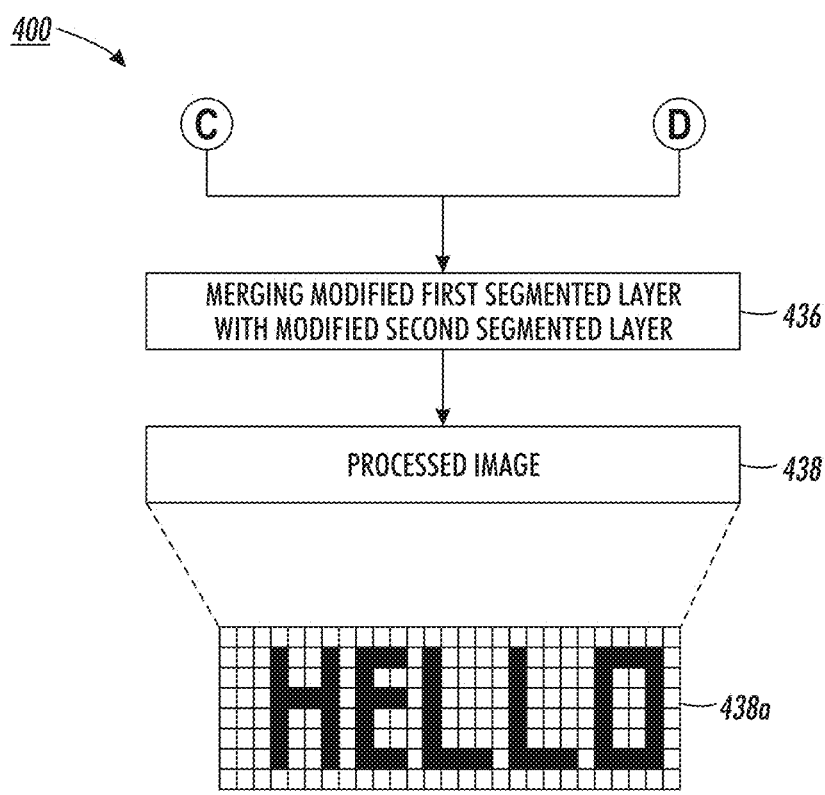

FIGS. 4A, 4B, and 4C illustrate an exemplary scenario 400 to process the image in accordance with at least one embodiment. FIGS. 4A, 4B, and 4C are explained in conjunction with FIG. 1, and FIG. 2.

Consider an image 402, which is received by the application server 104 from a user-computing device 102, and is to be processed. 402a represents an exemplary received image 402. A word "HELLO" is written on the image 402a. 404 refers to segmentation of the received image 402. The application server 104, which consists of an image processing unit 206, segments the received image 402 into the first segmented layer 406 and the second segmented layer 408. 406 refers to the first segmented layer and 406a is an exemplary pictorial representation of 406. 408 refers to the second segmented layer and 408a represents an exemplary pictorial representation of the second segmented layer after segmentation of received image 402a. 406b refers to plurality of first pixels in the first segmented layer 406a. 406c refers to one or more fourth pixels in the first segmented layer 406a. In an embodiment, the one or more fourth pixels 406c are a subset of the plurality of first pixels 406b. 408b refers to the plurality of second pixels in the second segmented layer 408a. "E", "L", and "O" represents the set of text components of the second segmented layer. "E" is a text component in second segmented layer. "L" is a text component in second segmented layer. "O" is a text component in second segmented layer. Therefore, the second segmented layer has three text components in total.

410 refers to binarization of the first segmented layer 406. The first segmented layer 406 is binarized by the image processing unit 206 using one or more techniques known in the art. 412 represents a binarized first segmented layer. Each pixel in the binarized first segmented layer has a value associated with it either 0 or 1. In an embodiment, a pixel with 0 value represents that the pixel has a value that is below a predetermined threshold, and a pixel with 1 value represents that the pixel has a value that is above a predetermined threshold. 412a represents an exemplary pictorial representation of the binarized first segmented layer 412.

Further, a region is identified in the binarized first segmented layer 412 using connected component analysis technique. 418 and 420 represents identified regions in the first segmented layer. 422 refers to a fourth pixel, the coordinates of which is determined by the image processing unit 206. In this example the coordinate of the fourth pixel 422 is (7,5) as the fourth pixel 422 is located in seventh column and fifth row. 426 refers to the third pixel in the second segmented layer 408a. In this example, the coordinates of the third pixel 426 is (7,5).

In this exemplary scenario, the predetermined vicinity is considered to be 3×3 pixels. In an embodiment, vicinity of 3×3 pixels refers to a range for which the image processing 206 unit checks for the set of second pixels, representing each text component in the second segmented layer. 428 represents a range for which the vicinity check condition is performed. In an embodiment, the vicinity check condition refers to a condition in which the presence of a set of second pixels is checked in a predetermined range of a third pixel 426. If vicinity check condition is met then first size of the identified region 418 is compared with a second size and an average size of the set of text components, in the second segmented layer, in accordance with equation 3. In an embodiment, the first size of the identified region 418 is a count of fourth pixel in the identified region 418. In this example, the text component "H" refers to the identified region 418 and the first size of the identified region 418 is 14 pixels.

In such an exemplary scenario, the average size of the set of text components in the second segmented layer is also 14 as there is only one text component in vicinity of the third pixel 422. Further, in this example, user-defined input k, is considered to be 2. Then the term ($T_{avg}$−k) becomes (14−2)=12. Therefore, the first size of the identified region 418 satisfies the equation 3. Thus, the identified region 418 is recognized as a text component.

Thereafter, the identified region 418 is extracted from the first segmented layer. After extraction of the identified region from the first segmented layer, the identified region is merged with the second segmented layer. Similarly, a coordinate of a fourth pixel from next identified region 420 is selected. In an embodiment, the vicinity check condition is performed for one or more fourth pixels, representing the set of text components in the second segmented layer, in the vicinity of the third pixel, which has coordinates similar to the coordinates of the pixel selected from the identified region 420. If the vicinity check condition is satisfied, the first size of the identified region 420 is compared with the average size and the second size of the set of text components in the second segmented layer. The first size of the identified region 420 is 9. The first size of the identified region 420 satisfies the equation 3. Therefore, the identified region 420 is recognized as a text component. Thereafter, the identified region 420 is extracted from the first segmented layer to obtain a modified first segmented layer 432a. After extraction, the identified region 420 is merged with the second segmented layer 408a to obtain a modified second segmented layer 434a.

A person skilled in the art will understand that the scope of the disclosure should not be limited to extracting only two identified regions. Further, the examples provided in supra are for illustrative purposes and should not be construed to limit the scope of the disclosure.

Further, 436 refers to merging of the modified first segmented layer 432a with the modified second segmented layer 434a to get a processed image 438a. Further, the processed image 438a may be transmitted to the user-computing device 102 via the communication network 106.

Various embodiments of the disclosure provide a non-transitory computer readable medium and/or storage medium, and/or a non-transitory machine-readable medium and/or storage medium having stored thereon, a machine code and/or a computer program having at least one code section executable by a machine and/or a computer to process an image. The at least one code section in an application server 104 causes the machine and/or computer comprising one or more processors to perform the steps, which comprises segmentation of the image into a first segmented layer and a second segmented layer. The one or more processors may identify a region based on a first value of plurality of first pixels in the first segmented layer. The one or more processors may further determine, for each coordinate in the identified region, if one or more second pixels, in a vicinity of a third pixel at the coordinate in the second segmented layer of the image, are representative of the set of text components based on at least a second value of each of the one or more second pixels. The one or more processors may compare a first size of the identified region with at least an average size of the set of text components in the second segmented layer based on the determination. The one or more processors may further merge the identified region with the second segmented layer based on the comparison.

Various embodiments of the disclosure encompass numerous advantages including methods and systems for correction of an image after segmentation. In an embodiment, correction of images may be performed on an MRC compressed image. The correction of the image may be performed by detecting and extracting wrongly segmented set of text components in a first segmented layer (image layer) and merging it with second segmented layer (text layer) that comprise of the plurality of text components. In an embodiment, the readability of the image may be increased after correction of the image as the text has greater resolution when compared to the components in the image layer.

The present disclosure may be realized in hardware, or in a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

A person with ordinary skill in the art will appreciate that the systems, modules, and sub-modules have been illustrated and explained to serve as examples and should not be considered limiting in any manner. It will be further appreciated that the variants of the above disclosed system elements, modules, and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules, and are not limited to any particular computer hardware, software, middleware, firmware, microcode, and the like. The claims can encompass embodiments for hardware and software, or a combination thereof.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A method for processing an image, the method comprising:
    segmenting, by one or more processors, the image into a first segmented layer and a second segmented layer;
    identifying, by the one or more processors, a region in the first segmented layer of the image based on at least a first value of plurality of first pixels in the first segmented layer;
    for a coordinate in the identified region:
    determining, by the one or more processors, if one or more second pixels, in a vicinity of a third pixel at the coordinate in the second segmented layer of the image, are representative of a set of text components based on at least a second value of each of the one or more second pixels;
    comparing, by the one or more processors, a first size of the identified region with at least an average size of the set of text components in the second segmented layer based on the determination; and
    merging, by the one or more processors, the identified region with the second segmented layer based on the comparison.

2. The method according to claim 1 further comprising binarizing, by the one or more processors, the first segmented layer to create a binarized first segmented layer.

3. The method according to claim 2, wherein the region is identified in the binarized first segmented layer based on a connected component technique.

4. The method according to claim 1, wherein the vicinity of the third pixel comprises a predetermined count of the one or more second pixels.

5. The method according to claim 1, wherein the first size of the identified region is determined based on a number of one or more fourth pixels in the identified region of the first segmented layer.

6. The method according to claim 1, wherein the average size of the set of text components corresponds to a ratio of a count of a set of second pixels of the one or more second pixels, representing each text component in the set of text components, and a count of the each text component in the set of text components.

7. The method according to claim 1 further comprising comparing, by the one or more processors, the first size of the identified region with a second size of the set of text components in the second segmented layer.

8. The method according to claim 7, wherein the second size of the set of text components corresponds to a count of a set of second pixels, representing a text component from the set of text components, which has a maximum count of the set of second pixels among the count of the set of second pixels representing other text components in the set of text components.

9. An application server for processing an image, the application server comprising:
    one or more processors configured to:
    segment the image into a first segmented layer and a second segmented layer;
    identify a region in a first segmented layer of the image based on at least a first value of plurality of first pixels in the first segmented layer;
    for a coordinate in the identified region:
    determine if one or more second pixels, in a vicinity of a third pixel at the coordinate in the second segmented layer of the image, are representative of a set of text components based on at least a second value of each of the one or more second pixels;

compare a first size of the identified region with at least an average size of the set of text components in the second segmented layer based on the determination; and merge the identified region with the second segmented layer based on the comparison.

10. The application server according to claim 9, wherein the one or more processors are configured to binarize the first segmented layer to create a binarized first segmented layer.

11. The application server according to claim 10, wherein the one or more processors are configured to identify the region in the binarized first segmented layer based on a connected component technique.

12. The application server according to claim 9, wherein the vicinity of the third pixel comprises a predetermined count of the one or more second pixels.

13. The application server according to claim 9, wherein the one or more processors are configured to determine the first size based on a number of one or more fourth pixels in the identified region of the first segmented layer.

14. The application server according to claim 9, wherein the average size of the set of text components corresponds to a ratio of a count of a set of second pixels of the one or more second pixels, representing each text component in the set of text components, and a count of the text component in the set of text components.

15. The application server according to claim 9, wherein the one or more processors are configured to compare the first size of the identified region with a second size of the set of text components in the second segmented layer.

16. The application server according to claim 15, wherein the second size of the set of text components corresponds to a count of a set of second pixels, representing a text component from the set of text components, which has a maximum count of the set of second pixels among the count of the set of second pixels representing other text components in the set of text components.

17. A computer program product for use with a computer, the computer program product comprising a non-transitory computer readable medium, wherein the non-transitory computer readable medium stores a computer program code for processing an image, wherein the computer program code is executable by one or more processors to:

segment the image into a first segmented layer and a second segmented layer;

identify a region in a first segmented layer of the image based on at least a first value of plurality of first pixels in the first segmented layer;

for a coordinate in the identified region:

determine if one or more second pixels, in a vicinity of a third pixel at the coordinate in the second segmented layer of the image, are representative of a set of text components based on at least a second value of each of the one or more second pixels;

compare a first size of the identified region with at least an average size of the set of text components in the second segmented layer based on the determination; and merge the identified region with the second segmented layer based on the comparison.

* * * * *